United States Patent [19]

Culligan et al.

[11] Patent Number: 5,329,859

[45] Date of Patent: Jul. 19, 1994

[54] INCREASED STRENGTH RAILWAY TANK FOR UNDERFRAME CONSTRUCTION AND METHOD WITH CENTER SILL POCKET AND WELD SUPPORT FOR POOLING WELDING MATERIAL

[75] Inventors: Laurence E. Culligan, Portage Des Sioux; Paul J. Dumser, St. Charles, both of Mo.

[73] Assignee: ACF Industries, Incorporated, Earth City, Mo.

[21] Appl. No.: 89,344

[22] Filed: Jul. 12, 1993

[51] Int. Cl.5 .............................................. B61D 17/00
[52] U.S. Cl. ..................... 105/416; 105/362; 105/413; 403/271; 228/215
[58] Field of Search ............... 105/362, 413, 416; 228/165, 215; 403/270, 271, 272

[56] References Cited

U.S. PATENT DOCUMENTS

| | | | |
|---|---|---|---|
| 1,764,617 | 6/1930 | Ford | 228/165 X |
| 3,645,213 | 2/1972 | Taylor | 105/362 |
| 4,896,814 | 1/1990 | Allain et al. | 228/215 |
| 5,044,869 | 9/1991 | Shindo et al. | 228/215 X |
| 5,159,882 | 11/1992 | King et al. | 105/362 |

FOREIGN PATENT DOCUMENTS 2919528 11/1979 Fed. Rep. of Germany ...... 228/215
48490 4/1980 Japan ................................... 228/215

Primary Examiner—Robert J. Oberleitner
Assistant Examiner—S. Joseph Morano
Attorney, Agent, or Firm—Polster, Lieder, Woodruff & Lucchesi

[57] ABSTRACT

An underbody structure (10) supporting an end of a railway car body (B, B') cradled in a cradle pad (12, 12'). A center sill assembly (16) has first and second spaced apart side plates (18, 20) spaced to either side of the longitudinal centerline of the car body. A top plate (28) extends along the center sill assembly, the width of the top plate corresponding to the width between the side plates. The top plate is attached to the side plates to form part of the center sill assembly. A weld support (50) is installed on both sides of the assembly. Part of the respective side plates and top plate are cut-away at the junction formed between to form a pocket (56) in which welding material pools. Weld support members (52, 54) are attached to the top plate adjacent the pockets. The weld supports provide a substantial contact surface between the center sill assembly and the cradle pad. Each weld support helps dam the pooled welding material so it is available to effect a strong and durable weld between the cradle pad and center sill assembly. This allows the tank car to carry heavier loads than could previously be carried.

30 Claims, 4 Drawing Sheets

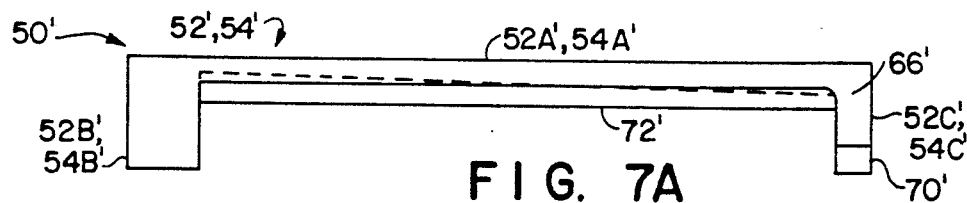
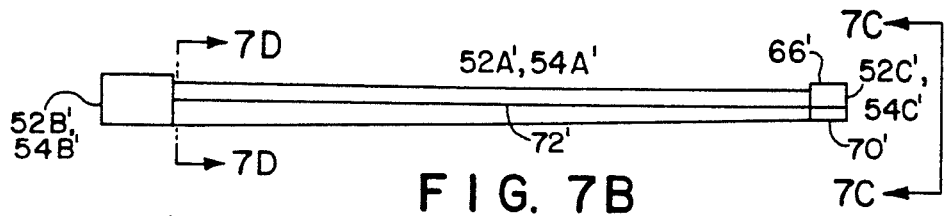
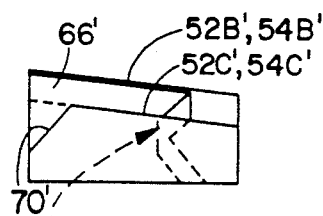
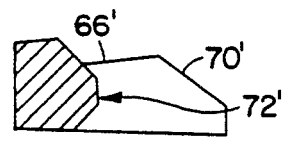
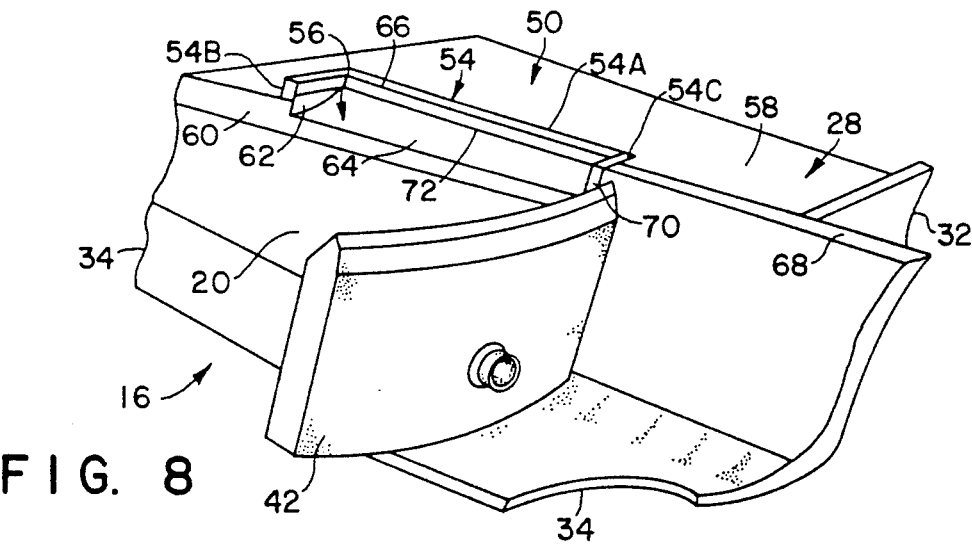
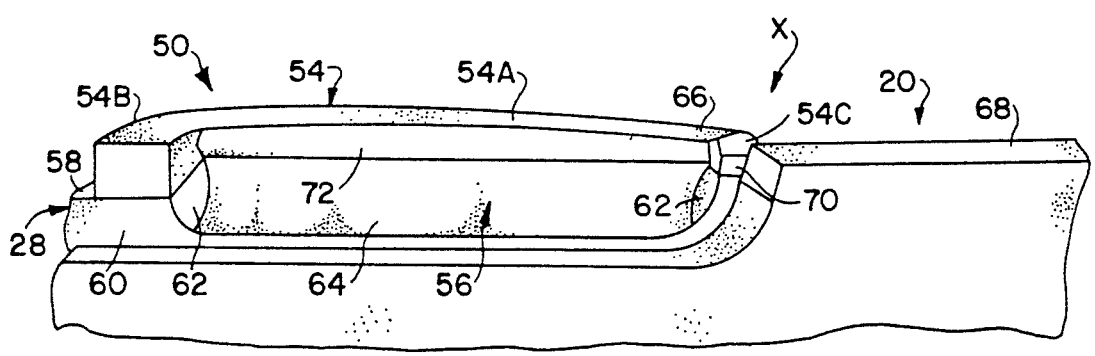

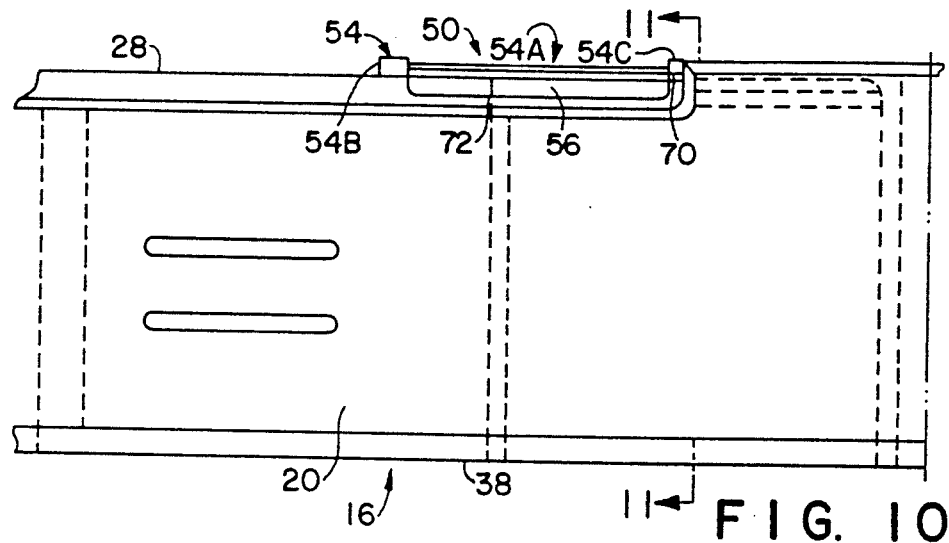
FIG. 10
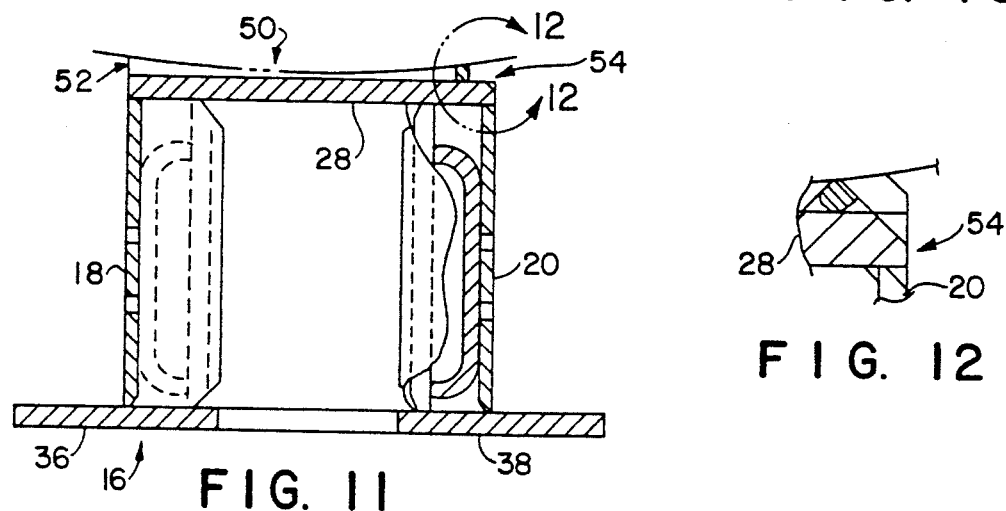
FIG. 11
FIG. 12
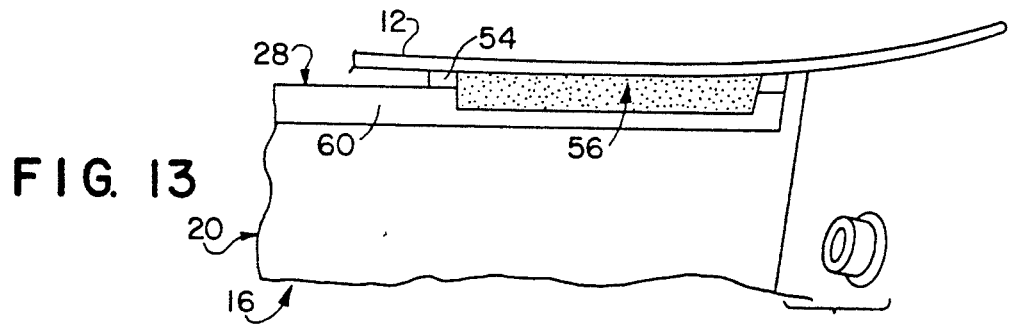
FIG. 13
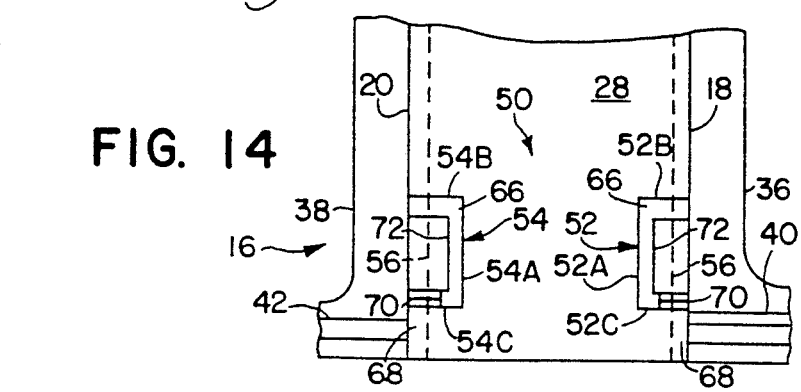
FIG. 14

INCREASED STRENGTH RAILWAY TANK FOR UNDERFRAME CONSTRUCTION AND METHOD WITH CENTER SILL POCKET AND WELD SUPPORT FOR POOLING WELDING MATERIAL

BACKGROUND OF THE INVENTION

This invention relates to the fabrication of tank cars for railway use and, more particularly, to an underbody or underframe construction for such a tank car and a method of underframe construction.

During fabrication of the underframe assembly for a railway tank car, a critical step involves the attachment of the sill assembly portion of the underframe to the tank. A railway tank car underbody and a method of its construction are shown, for example, in U.S. Pat. No. 5,159,882, which is assigned to the same assignee as the present application. As shown in the center sill assembly 102 of FIG. 11 in the '882 patent, respective metal bars 128, 130 are welded to the respective upper, inner faces of side plates 118, 120. A top plate 132 is welded to the bars and extends longitudinally of the side plates. The cradle pad 108 for tank car body 106 is the welded to the center sill assembly.

The initial outboard weld; i.e., the weld between the cradle pad and the center sill assembly, is critical. In this regard, the construction shown in the '882 patent includes a weld attachment for assembly of the cradle pad 108 to the center sill assembly. This arrangement includes a bevel and a fillet weld. While this assembly method effectively attaches the cradle pad and center sill assembly together, the weld effectiveness is only as strong as the sill web. It will be appreciated that the length of the weld, and the amount of weld material which can be used to complete the weld is limited by the space limitations imposed by the design and fabrication of the center sill assembly. The problem with this current arrangement is that as haulers are looking for tank cars with higher load capabilities, the strength limitation imposed by this construction could inhibit the manufacture of tank cars with the desired increased capabilities.

Different approaches have been considered to provide a stronger weld between the cradle pad and center sill. One approach, for example, would be for the top cover plate to have a contoured upper surface. The contour would correspond to that of the botton portion of the cover pad attached to the center sill by welding along the top plate. While feasible, this approach is also expensive since the top plate would not be a standard piece of steel. In addition, the top plate would probably be heavier, thus adding weight to the railcar.

SUMMARY OF THE INVENTION

Among the several objects of the present invention may be noted the provision of an underframe or underbody construction for a railway tank car; the provision of such a construction which is a center sill assembly which can be used to fabricate both straight barrel and slope bottom tank cars, as well as insulated and non-insulated tank cars; the provision of such an underbody construction for providing a larger, stronger, and more effective connection between a top cover plate and side plates of the center sill assembly as well as between the sill assembly and tank cradle pad than was previously possible; the provision of such an underbody construction to employ a pair of weld supports, one on either side of the top plate; the provision of such an underbody construction to create pockets on each side of the top plate in which welding material is pooled so more welding material is available at the weld sites created at the juncture between the center sill assembly and cradle pad; the provision of such an underbody construction to install a weld support adjacent each pocket to provide a longer contact surface, and more surface contact area, between the cradle pad and center sill assembly; the provision of such an underframe construction to facilitate a stronger and more durable weld between the center sill assembly and cradle pad so to provide a tank car capable of carrying a heavier load; the provision of such an underframe construction which is readily modified from current underframe construction methods; the provision of such an underframe construction method for fabricating the underframe used at each end of the railcar; and the provision of such an underframe construction method which is a low cost improvement over current construction methods.

In accordance with the invention, generally stated, an underbody structure for a railway car supports one end of a railway car body, such as a tank. The tank is cradled in a cradle pad. The underbody construction includes a center sill assembly having first and second spaced apart side plates spaced to either side of the longitudinal centerline of the car body. The assembly also includes a top plate whose width corresponds to the spacing between the side plates. The top plate is attached to the side plates by welding, for example. Part of the top plate, on both sides of the plate, is cut-away at the junction formed between the top plate and respective side plates during fabrication of the center sill assembly. A weld support is then welded to the top plate adjacent a pocket formed by the cut-away material. The weld supports extend above the upper surface of the top plate for a bottom surface of the cradle pad to rest upon the weld supports. The weld supports are welded to the cradle pad and provide a substantial contact surface between the center sill assembly and cradle pad. Each weld support pools welding material in its associated pocket to help effect a strong weld between the cradle pad and center sill assembly. Other objects and features will be in part apparent and in part pointed out hereinafter.

BRIEF DESCRIPTION OF THE DRAWINGS

FIGS. 7A–7D are views corresponding to FIGS. 6A–6D for a weld support for use in fabricating a center sill assembly for a tip-tank car;

FIG. 8 is a perspective view of the portion of the center sill assembly where a weld support is installed;

FIG. 9 is another perspective view showing the portion of the center sill assembly with the weld support installed;

FIG. 10 is a partial side elevational view of the center sill assembly with a weld support installed;

FIG. 11 is a sectional view taken along line 11—11 in FIG. 10;

FIG. 12 is an enlarged view of a portion of the sectional view of FIG. 11;

FIG. 13 is a perspective view of the center sill assembly with the tank car cradle pad attached at the weld support location; and, FIG. 14 is a partial top plan view of the center sill assembly showing installation of weld support members.

Corresponding reference characters indicate corresponding parts throughout the drawings.

DESCRIPTION OF PREFERRED EMBODIMENTS

Figure 1:
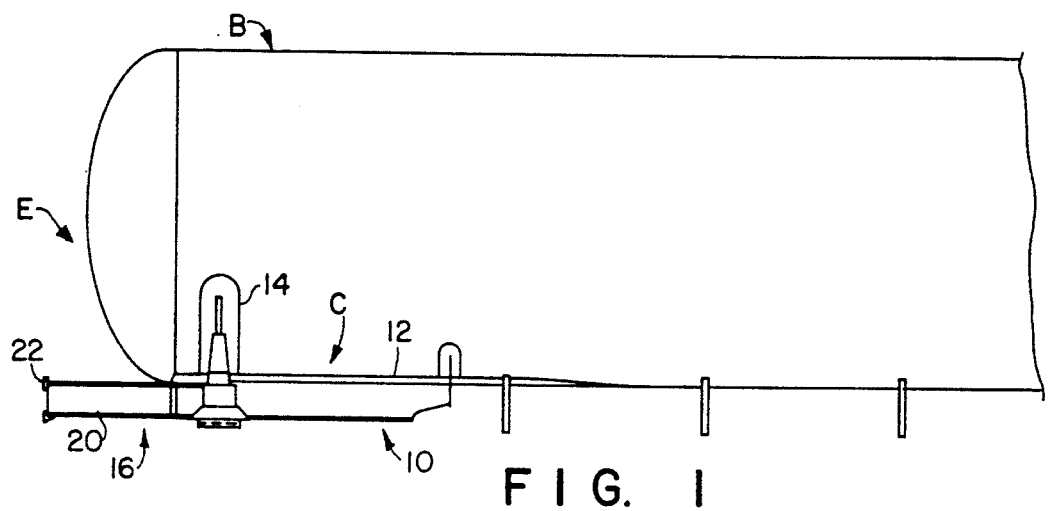
FIG. 1 is a representation of a straight barrel railway tank car having an underframe structure made in accordance with the present invention.
Figure 2:
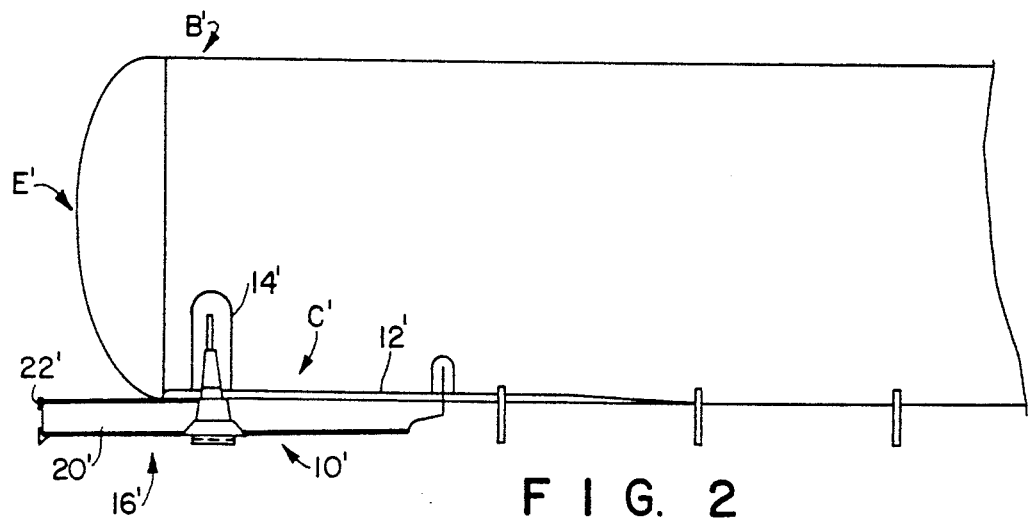
FIG. 2 is a representation similar to FIG. 1 for a tip-tank railway car.
Figure 3:
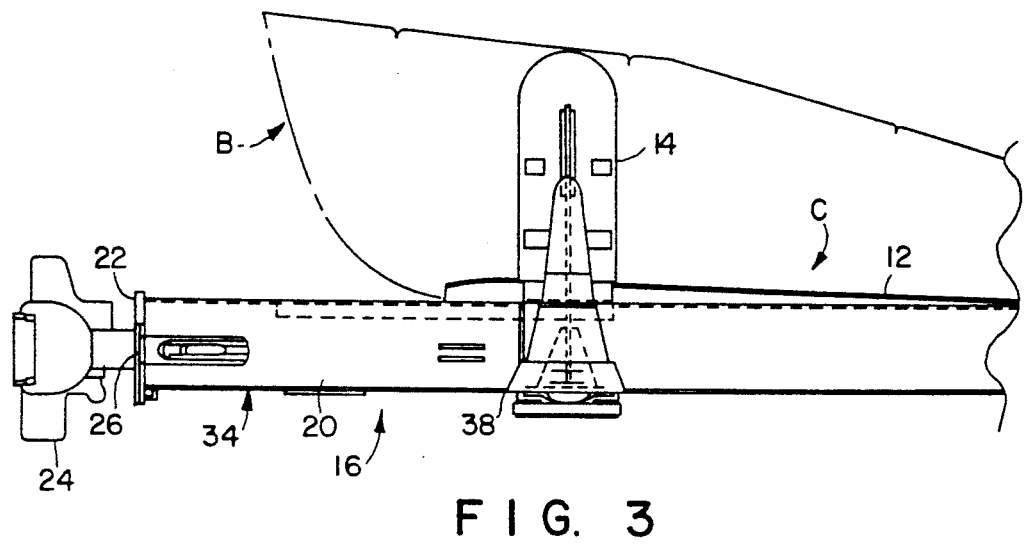
FIG. 3 is a side elevational view of a center sill assembly for a railway tank car.

Referring to the drawings, an underbody structure of the present invention is indicated generally 10. Underbody 10 supports an end E of an elongate railway car body B. As shown in FIG. 1, body B is what is commonly referred to as a "straight barrel" body. Alternately, as shown in FIG. 2, a body B' has a tapered or sloped bottom portion and is commonly referred to as a "tip tank" body. In addition to the overall body shape, the tank may also be either insulated, or non-insulated. Regardless, the body is cradled in a cradle pad assembly, C or C' respectively. The formation of the tank car body and its associated cradle pad assembly form no part of this invention. However, for purposes of understanding the invention, the cradle pad assembly includes a curved, draft sill reinforcing plate 12, also referred to as the tank cradle pad. This plate extends beneath the tank car parallel to the longitudinal centerline thereof. The curvature of the plate corresponds to that of the tank car body. A bolster reinforcing plate 14, or tank cradle, curves around the underside of the tank car body and upwardly along each side of the body. Again, the curvature of the tank cradle corresponds to that of the tank car body. There is a cradle pad assembly at each end of the tank car.

Underbody 10 first includes a center sill assembly 16. As with the cradle pad, there is a center sill assembly at each end of a tank car. Because the center sill assemblies are essentially identical in design and construction, only one is described in detail. The center sill assembly includes first and second spaced apart side plates 18, 20. The side plates extend longitudinally along each side of the tank body, and are equidistantly spaced to either side of the longitudinal centerline of the tank body. The height of the side plates increase from a shorter to a larger height at a point just rearward of the point where cradle pad assembly C is attached to center sill assembly 16. This point is indicated X in the drawing figures. The side plates are joined together, at the forward end of the center sill assembly by a striker plate 22. A coupler 24 for coupling railcars together is mounted to the sill assembly at this end of it. One end of the coupling fits through an opening 26 in the striker plate.

Figure 4:
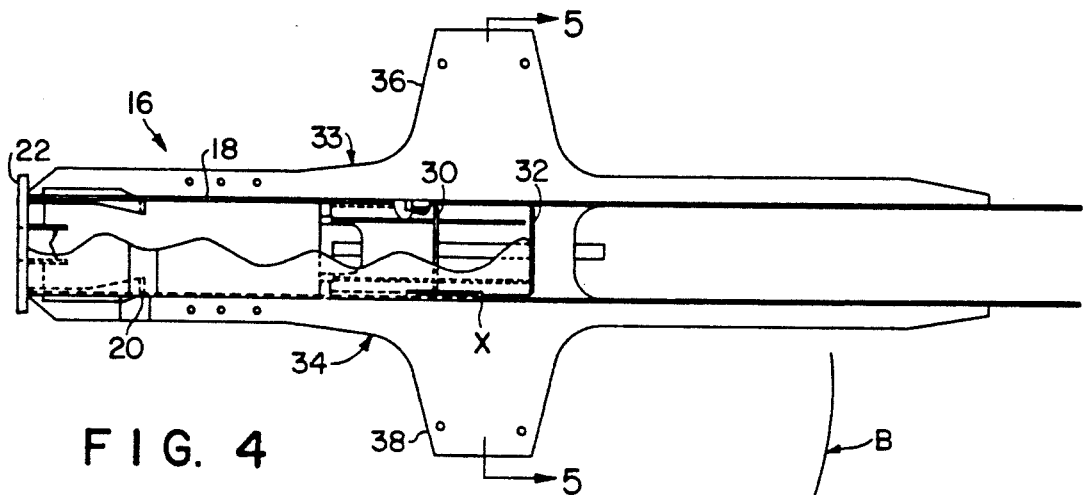
FIG. 4 is top plan view, partly in section, of the center sill assembly of FIG. 3.

The center sill assembly also includes a top plate 28. Plate 28 has a thickness of approximately 0.875 in. (2.22 cm.). The width of the plate corresponds to the distance between side plates 18, 20. As shown in FIG. 4, a pair of plates 30, 32 extend transversely of the side plates. These plates are parallel to each other with the forward of the two plates (plate 30) being located slightly forwardly of the step increase in height of the side plates. The rearward of the plates (plate 32) is located approximately 12 in.–13 in. to the rear of the first plate. Top plate 28 extends from striker plate 22 rearwardly to transversely extending plate 32.

Figure 5:
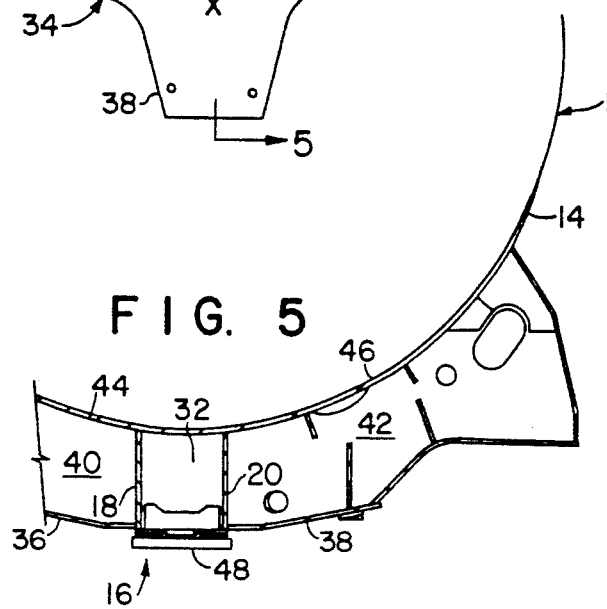
FIG. 5 is a sectional view taken along line 5—5 in FIG. 4.

A flange 33, 34 is attached to, and extends longitudinally of, each side plate. The flanges are welded at the lower end of each side plate. The flanges extend laterally outward from the side plates. Each flange includes a bottom bolster section 36, 38 respectively. Referring to FIGS. 5 and 8, a bolster web 40, 42 is welded to the respective bottom bolster sections. The upper end of each web is curved to match the contour of the tank cradle 14. Each bolster web may be formed from a plurality of plates which are welded together. Respective top bolster plates 44, 46 are attached to the upper, contoured surface of the webs. The plates 44, 46 support the respective curved sides of the tank cradle. As also shown in FIG. 5, a main bearing assembly 48 is secured to the center sill assembly between the lower end of the respective side plates. The main bearing assembly, in turn, fits upon a truck center plate of a truck (not shown).

Next, a weld support 50 comprises a weld support member 52 and a weld support member 54, one or both of which are installed on center sill assembly 16. See FIG. 14. Each weld support member is generally U-shaped in plan and has a center section 52A, 54A, and respective end segments 52B, 54B, and 52C, 54C. Each weld support member is attached to the center sill assembly by welding the support to top plate 28 at respective sides of the top plate as shown in FIG. 14. The weld support members 52, 54, as described above and shown in FIG. 6, are for use on a center sill assembly used for a straight barrel tank B. A corresponding weld support member 52', 54', for use with a tip-tank tank B', is shown in FIG. 7. Because the two constructions have only minor differences between them, only the configuration and use of the weld supports 52, 54, are described in detail.

As particularly shown in FIGS. 8 and 9, a pocket 56 is formed in the center sill assembly. Pocket 56 is formed by cutting away a portion of top plate 28 and, if desired, a portion of the respective side plate 18 or 20, at the junction between the respective side plate and the top plate. Each pocket is formed after the top plate has been joined with the side plates. Referring to FIGS. 8 and 9, top plate 28 has a generally diagonal cut made from its top face 58 to its side face 60. These cuts extend approximately 1 in. (2.54 cm.) into the top surface of plate 28, from the side of the plate. The spacing between the cuts corresponds to the width of weld support member between its end pieces. This width is, for example, 9 in. (22.8 cm.). While the cuts are generally made only in the top plate, they may extend into the respective side plate, if so desired. After the diagonal cuts are made, a longitudinal cut is made along top surface 58 of plate 28. The length of this cut corresponds to the width of the weld support member. Once the cuts are made, the material they encompass is cut-away. In doing so, a curved or scalloped surface is formed in the top plate. The removed material leaves a pocket 56 having vertical end walls 62, and the curved sidewall 64.

When each weld support member is attached to top plate 28 adjacent the respective pockets 56, the members then extend above upper surface 58 of the top plate. As shown in FIGS. 8, 9, 13, and 14, the top surface 66 of the members, at end piece 52C, 54C of the respective members, is generally flush with upper edge 68 of side plate 18 or 20. This is because this end of the weld support member is adjacent the location X referred to previously where there is a step increase in the height of the side plates. Accordingly, the bottom surface of cradle pad 12 now rests against upper surface 66 of each weld support member. Heretofore, the length of support corresponded to the length of the stepped-up height portion of the side plate upon which the cradle pad rested. Now, however, the support surface, on both sides of the center sill assembly, is increased by the length of the weld support members. This increase in length is, for example, 10.5 in. (26.7 cm.), which is a substantial increase in the contact surface area between the center sill assembly and cradle pad. In this regard, with respect to FIGS. 6B and 7B, it will be noted that the height of weld support members 52, 54, is generally uniform along the length of the support. For support members 52', 54', the height of the weld support member decreases from one end (52B', 54B') to the other (52C', 54C') This is because the lower surface of the tip-tank tapers or slopes downwardly toward the center of the railcar.

In addition to the increase in length, each end segment of the weld support members increase in height from the inner to the outer end of the member, as installed. This increase in height generally corresponds to the change in height of the cradle pad above the center sill assembly, as caused by the curved surface of cradle pad 14. Thus, the surface area on which the cradle pad is supported also is increased by use of the weld support members. This latter feature is the same for weld supports used with either the straight barrel or tip-tank design. For end piece 52C, 54C, the increase in height from the inner to outer end of the weld support only extends to the point where the height of the end piece corresponds with the stepped-up height of the associated side plate. From there, to the outer end 70 of the end piece, the height of the end piece tapers off. Otherwise, if the height of the end piece further increased, or levelled off, there could be a misalignment of the cradle pad with the center sill assembly.

Figure 6A:
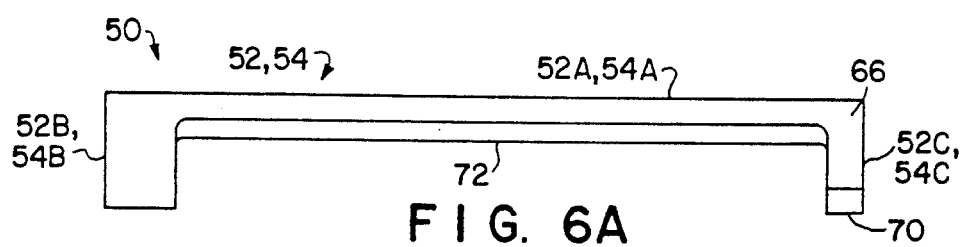
FIGS. 6A–6C are respective top plan, and front and end elevational views of a weld support for use in fabricating the center sill assembly for a straight barrel tank car.
Figure 6B:
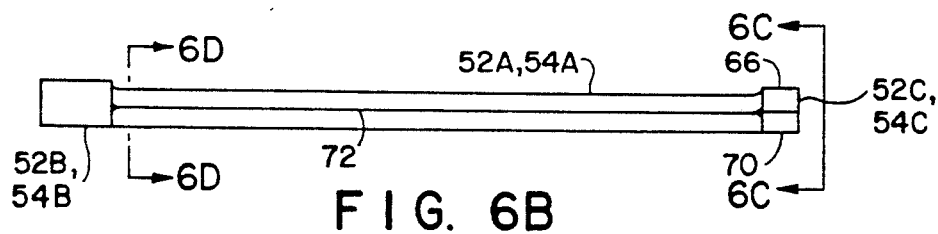
Figure 6C:
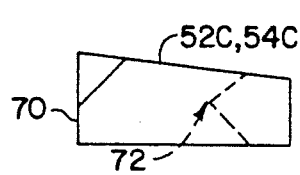
Figure 6D:
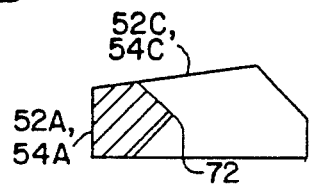
FIG. 6D is a sectional view taken along line 6D—6D in FIG. 6B.

As noted, the respective weld supports are installed by welding them to upper surface 58 of top plate 28. Thereafter, when the cradle pad is to be attached to the center sill assembly, welding material used at the junction between the weld support member and cradle pad, pools or collects in pocket 56. The construction of the weld supports help effect this pooling. To this end, the center section of each weld support is shown in FIGS. 6C and 6D to be triangular in cross-section. The apex 72 of this triangle extends outwardly over pocket 56. This triangular face of the weld support thus forms a fourth and enclosing side of the pocket so to dam the welding material in the pocket. As such, the welding material collects in the pocket. By accumulating welding material, more material is available for forming a bead along the junction between the cradle pad and weld support. This makes for a stronger weld. By providing a stronger weld on each side of the underbody construction, and at each end of the car, the tank is capable of carrying heavier loads than cars using conventionally fabricated underframes or underbodies.

What has been described is an underframe or underbody construction for a railway tank car. The construction and construction method are usable with many types of tank cars such as straight barrel and slope bottom tank cars, as well as insulated and non-insulated tank cars. By fabricating an underframe using the fabrication method of the invention produces a stronger and more durable connection between a center sill assembly and the cradle pad supporting the tank body mounted on the car. This provides for a car with a higher load carrying capacity. The underbody construction includes forming a pocket for pooling welding material on both sides of the sill assembly and installing a weld support adjacent each pocket. This allows more welding material to be available at the weld site where the cradle pad and center sill assembly are joined. Use of the weld supports also provides a longer contact surface, and more contact surface area, between the cradle pad and center sill assembly. The weld supports are readily installed during fabrication of the center sill assembly. Finally, underframe construction and construction method provide a low cost improvement over current constructions and construction methods.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An underbody construction for supporting the end of an elongate railway car body, the body being cradled in a cradle pad, and the underbody construction comprising:

a center sill assembly having first and second spaced apart side plates respectively spaced to either side of a longitudinal centerline of the car body, and a top plate fitting over the side plates, the width of the top plate corresponding to the spacing between the side plates, the top plate being attached to the side plates to form part of the center sill assembly;

a pocket formed in the top plate at the respective sides thereof where the top plate meets one of the side plates, the pockets being used to pool welding material used to join the cradle pad and center sill assembly; and, a weld support installed on the center sill assembly adjacent each pocket, each weld support being attached to the top plate adjacent its associated pocket, the weld supports extending above the upper surface of the top plate for a bottom surface of the cradle pad to rest on each weld support, and each weld support being attached to the cradle pad to provide a substantial contact surface between the center sill assembly and cradle pad with the pooled welding material collected in each pocket effecting a strong and durable weld between the cradle pad and center sill assembly.

2. The underbody structure of claim 1 wherein the center sill assembly further includes a bolster extending outwardly from each side plate, each bolster having a contoured upper surface for supporting the cradle pad, and said weld supports being positioned immediately adjacent the junction between the respective side plates and bolsters.

3. The underbody structure of claim 2 wherein the weld supports are installed on the side of the bolsters toward the end of the car body.

4. The underbody structure of claim 1 wherein each weld support has an elongate center section extending lengthwise of the center sill assembly, and integrally formed side pieces at each end of the center section, the end segments extending outwardly toward the sides of the center sill assembly when the weld support is fitted in place.

5. The underbody structure of claim 4 wherein the bottom surface of the weld support is flat for the weld support to rest on an upper surface of the top plate.

6. The underbody structure of claim 4 wherein the height of the end segments increases from the center section outwardly to the outer end of each end segment, the change in height approximating the curvature of the cradle pad for the underside of the cradle pad to rest upon an upper surface of the weld support substantially along the width of the weld support.

7. The underbody structure of claim 6 wherein the center section has a triangular shaped inner wall extending between the end segments, the inner wall and end pieces forming a dam to pool the welding material collecting in the pocket.

8. The underbody structure of claim 4 wherein one end segment is wider than the other.

9. The underbody structure of claim 8 wherein the center sill assembly has a bolster extending outwardly from each side plate with the weld supports installed on the side of the bolsters toward the end of the car body with the narrower end segment of the weld support being adjacent the bolster.

10. The underbody structure of claim 9 wherein an outer face of the narrower end segment is angled inwardly toward the bottom surface of the weld support.

11. The underbody structure of claim 1 wherein the center sill assembly further includes a pair of reinforcing plates extending between the respective side plates, each side plate having a step increase in height at a point intermediate the length of the side plates, one of the reinforcing plates being installed adjacent the location of the respective step increases, and the top plate extending from a forward end of the side plates to said one of the reinforcing plates.

12. The underbody structure of claim 1 wherein the car body is a tank body and is either of a straight barrel tank body or a tip-tank body, and the structure uses a differently contoured said weld support depending upon the type of tank car body installed on the underbody structure.

13. An underbody structure for supporting the end of a straight barrel, railway, tank car body, the tank car body being cradled in a cradle pad, and the underbody structure comprising:
a center sill assembly having first and second spaced apart side plates which are equidistantly spaced to either side of a longitudinal centerline of the tank car body, a top plate extending a portion of the length of the center sill assembly, the width of the top plate corresponding to the width between the side plates for attachment to the side plates to form part of the center sill assembly, and first and second reinforcing plates extending transversely between the side plates;
a pocket formed in the top plate at the respective sides thereof where the top plate meets one of the side plates, the pockets being used to pool welding material used to join the cradle pad and center sill assembly; and,
a weld support installed on the center sill assembly adjacent each pocket, each weld support being attached to the top plate adjacent its associated pocket, the weld supports extending above the upper surface of the top plate for a bottom surface of the cradle pad to rest on each weld support, and each weld support being attached to the cradle pad to provide a substantial contact surface between the center sill assembly and cradle pad with the pooled welding material collected in each pocket effecting a strong and durable weld between the cradle pad and center sill assembly.

14. The underbody structure of claim 13 wherein the center sill assembly includes a bolster extending outwardly from each side plate, each bolster having a contoured upper surface for supporting the cradle pad, said weld supports being positioned immediately adjacent the junction between the respective side plates and bolsters on the side of the bolsters toward the end of the car body.

15. The underbody structure of claim 13 wherein each weld support has an elongate center section extending lengthwise of the center sill assembly, and integrally formed end segments at each end of the center section, the end segments extending outwardly toward the sides of the center sill assembly when the weld support is fitted in place.

16. The underbody structure of claim 15 wherein the bottom surface of the weld support is flat for the weld support to rest on an upper surface of the top plate, and the height of the end segments increases from the center section outwardly to the outer end of each end segment, the change in height approximating the curvature of the cradle pad for the underside of the cradle pad to rest upon an upper surface of the weld support substantially along the width of the weld support.

17. The underbody structure of claim 16 wherein the center piece has a triangular shaped inner wall extending between the end segments, the inner wall and end segments forming a dam to pool the welding material collecting in the pocket.

18. The underbody structure of claim 13 wherein each side plate has a step increase in height at a point intermediate the length of the side plates, one of the reinforcing plates being installed adjacent the location of the respective step increases, and the top plate extending from a forward end of the side plates to said one of the reinforcing plates.

19. An underbody structure for supporting the end of a tip-tank railway tank car body, the tank car body being cradled in a cradle pad, and the underbody structure comprising:
a center sill assembly having first and second spaced apart side plates which are equidistantly spaced to either side of a longitudinal centerline of the tank car body, a top plate extending substantially the length of the center sill assembly, the width of the top plate corresponding to the width between the side plates for attachment to the side plates to form part of the center sill assembly, and a pair of reinforcing plates extending transveresely between the side plates;
a pocket formed in the top plate at the respective sides thereof where the top plate meets one of the side plates, the pockets being used to pool welding material used to join the cradle pad and center sill assembly; and, a weld support installed on the center sill assembly adjacent each pocket, each weld support being attached to the top plate adjacent its associated pocket, the weld supports extending above the upper surface of the top plate for a bottom surface of the cradle pad to rest on each weld support, and each weld support being attached to the cradle pad to provide a substantial contact surface between the center sill assembly and cradle pad with the pooled welding material collected in each pocket effecting a strong and durable weld between the cradle pad and center sill assembly.

20. The underbody structure of claim 19 wherein the center sill assembly includes a bolster extending outwardly from each side plate, each bolster having a contoured upper surface for supporting the cradle pad, said weld supports being positioned immediately adjacent the junction between the respective side plates and bolsters on the side of the bolsters toward the end of the car body.

21. The underbody structure of claim 19 wherein each weld support has an elongate center section extending lengthwise of the center sill assembly, and integrally formed end segments at each end of the center section, the end segments extending outwardly toward the sides of the center sill assembly when the weld support is fitted in place.

22. The underbody structure of claim 21 wherein the bottom surface of the weld support is flat for the weld support to rest on an upper surface of the top plate, and the height of the side pieces increases from the center piece outwardly to the outer end of each end segment, the change in height approximating the curvature of the cradle pad for the underside of the cradle pad to rest upon an upper surface of the weld support substantially along the width of the weld support.

23. The underbody structure of claim 22 wherein the center section has a triangular shaped inner wall extending between the end segments, the inner wall and end pieces forming a dam to pool the welding material collecting in the pocket.

24. The underbody structure of claim 19 wherein each side plate has a step increase in height at a point intermediate the length of the side plates, one of the reinforcing plates being installed adjacent the location of the respective step increases, and the top plate extending from a forward end of the side plates to said one of the reinforcing plates.

25. A method of fabricating an underbody structure for supporting the end of a railway tank car body which is cradled in a cradle pad, comprising:

forming a center sill assembly having first and second spaced apart side plates equidistantly spaced to either side of a longitudinal centerline of the tank car body, and a top plate extending substantially the length of the assembly, the width of the top plate corresponding to the width between the side plates and the center sill assembly being formed by welding together the side plates and the top plate;

cutting away a portion of the respective side plates and top plate at the respective junctions formed therebetween during formation of the center sill assembly, each cut-away portion forming a pocket; and, collecting welding material in each pocket and welding together the cradle pad and center sill assembly using the collected material, each pocket being formed adjacent a location where a weld between the center sill assembly and pad is to be made.

26. The method of claim 25 further including attaching weld supports to the upper surface of the top plate adjacent each pocket for a bottom surface of the body cradle pad to rest on each weld support, the length of each pocket corresponding to the length of the weld supports and the depth of each pocket corresponding to the length of respective side pieces of the weld supports, the pockets and their associated weld supports forming dams in which the weld material is collected during attachment of the cradle to the center sill assembly, the length of the weld supports providing a substantial contact surface between the center sill assembly and cradle pad, and the collecting of welding material at the welding site effecting a strong weld between the cradle pad and center sill assembly.

27. The method of claim 26 wherein wherein each side plate has a step increase in height at a point intermediate the length of the side plates, and the method includes installing one of the reinforcing plates adjacent the location of the respective step increases, the top plate extending from a forward end of the side plates to said one of the reinforcing plates.

28. The method of claim 25 further including forging each weld support to have integrally formed end segments at each end of an elongate center section, the end segments extending outwardly toward the sides of the center sill assembly when the weld support is fitted in place.

29. The method of claim 28 further including forming each weld support so the height of the end segments increases from the center section outwardly to the outer end of each end segment, the change in height approximating the curvature of the cradle pad for the underside of the cradle pad to rest upon an upper surface of the weld support substantially along the width of the weld support.

30. The method of claim 29 further including forming the weld support center piece to have a triangular shaped inner wall extending between the end segments, the inner wall and end segments forming the dam to collect the welding material collecting in each pocket.

* * * * *